US00RE41122E

(19) United States
(12) Reissued Patent
Jamel et al.

(10) Patent Number: US RE41,122 E
(45) **Date of Reissued Patent: *Feb. 16, 2010**

(54) FOOTWEAR WITH GPS

(75) Inventors: Mitchell W. Jamel, Boynton Beach, FL (US); Patrick E. Bertagna, Los Angeles, CA (US); Ralph H. Davis, Jr., Laguna Beach, CA (US)

(73) Assignee: GTX Corp, Los Angeles, CA (US)

( * ) Notice: This patent is subject to a terminal disclaimer.

(21) Appl. No.: 11/506,175

(22) Filed: Aug. 17, 2006

Related U.S. Patent Documents

Reissue of:
(64) Patent No.: 6,788,200
Issued: Sep. 7, 2004
Appl. No.: 10/274,730
Filed: Oct. 21, 2002

(51) Int. Cl.
*G08B 1/08* (2006.01)
*A43B 3/00* (2006.01)

(52) U.S. Cl. ..... 340/539.13; 340/539.11; 340/539.15; 340/825.36; 36/1; 36/75 R; 455/562.1; 455/575.7; 701/213; 342/357.06

(58) Field of Classification Search ..... 340/539.13, 340/539.11, 539.15
See application file for complete search history.

(56) References Cited

U.S. PATENT DOCUMENTS 1,597,823 A * 8/1926 Randolph ..... 362/103
2,760,278 A * 8/1956 Agrillo ..... 361/108
2,897,609 A * 8/1959 Bodkin ..... 36/1
4,703,445 A * 10/1987 Dassler ..... 702/160
4,870,700 A * 9/1989 Ormanns et al. ..... 455/92
5,285,586 A 2/1994 Goldston et al. ..... 36/137
5,473,518 A * 12/1995 Haber et al. ..... 362/103
5,557,259 A * 9/1996 Musa ..... 340/573.4
5,574,423 A * 11/1996 Vosika et al. ..... 340/333
5,574,432 A * 11/1996 McCarthy
5,655,316 A * 8/1997 Huang ..... 36/132
5,742,233 A * 4/1998 Hoffman et al. ..... 340/573.1
5,748,087 A * 5/1998 Ingargiola et al. ..... 340/573.7
5,825,327 A * 10/1998 Krasner ..... 342/357.09
5,970,631 A * 10/1999 Inman ..... 36/115
6,012,822 A * 1/2000 Robinson ..... 362/103
6,014,080 A * 1/2000 Layson, Jr. ..... 340/573.1
6,078,260 A * 6/2000 Desch ..... 340/573.1
6,243,039 B1 * 6/2001 Elliot ..... 342/457
6,247,251 B1 * 6/2001 James ..... 36/115
6,259,399 B1 7/2001 Krasner ..... 342/357.06
6,263,280 B1 * 7/2001 Stingone, Jr. ..... 701/213
6,278,370 B1 * 8/2001 Underwood ..... 340/573.1
6,317,049 B1 * 11/2001 Toubia et al. ..... 340/573.4
6,510,380 B1 * 1/2003 Curatolo et al. ..... 701/207
6,819,258 B1 11/2004 Brown ..... 340/825.49
6,838,998 B1 1/2005 Brown et al. ..... 340/825.49
2001/0026240 A1 * 10/2001 Neher ..... 342/357.07
2003/0160732 A1 * 8/2003 Van Heerden et al. ..... 343/897

* cited by examiner

*Primary Examiner*—Donnie L Crosland
(74) *Attorney, Agent, or Firm*—Henneman & Associates, PLC; Larry E. Henneman, Jr.

(57) ABSTRACT

The invention discloses a locator unit contained within footwear providing a method for GPS position determination and transmission of said location determination data to a central monitoring station which disseminates the data through the use of proprietary software, wireless communications, land based wire systems and the Internet.

19 Claims, 9 Drawing Sheets

FOOTWEAR WITH GPS

Matter enclosed in heavy brackets [ ] appears in the original patent but forms no part of this reissue specification; matter printed in italics indicates the additions made by reissue.

*CROSS-REFERENCE TO MULTIPLE REISSUE APPLICATIONS*

*Notice: More than one reissue application has been filed for the reissue of U.S. Pat. No. 6,788,200. The reissue applications are application numbers 0082-011R2 (the present application), 0082-011R1, 0082-011R3, and 0082-011R4.*

BACKGROUND OF THE INVENTION

1. Field of the Invention

The present invention relates generally to footwear and, more specifically, to a locator unit contained within footwear providing a method for GPS position determination and transmission of said location determination data to a central monitoring station which disseminates the data through the use of proprietary software and the Internet.

The footwear in the preferred embodiment contains the electronic circuitry in the mid sole of the shoe having GPS location determination unit and transponder whereby a remote location can determine the position of the wearer of said footwear having said device.

Furthermore, the present invention provides for additional elements by having the GPS unit and transponder contained within a socket positioned within the heel of the shoe.

The location component can be selectively inserted and or removed from the midsole or heel.

The socket in the midsole is comprised of a throughbore having spaced apart sidewalls and a top wall having retaining means positioned on each sidewall.

The heel socket is comprised of spaced apart sidewalls, top wall, a back wall and frontal aperture with the location of the socket preferably in the instep or heel of the shoe.

The insertable removable component has means for engaging the sidewalls of the receptacle and closure means for securing the component within said receptacle. Furthermore, the component can form a compartment for the inclusion of a GPS receiver and transponder for locating the wearer of said shoes.

The present invention provides for another additional element wherein the position determination component is contained within the tongue of the footwear.

In addition, to the electronic circuitry being embedded in the tongue of the shoe the antenna can be contained within a logo prominently placed on the tongue of the shoe which will increase the effectiveness of the device.

While the preferred embodiment of the present invention provides for an unobtrusive concealed locator device contained within the body of the shoe, it additionally provides for the attachment of a positioning determining device and transponder for transmitting the location data on demand in a module that can be releasably attached to the exterior of the shoe by means of the shoelaces or hook and loop material to the back of the footwear.

2. Description of the Prior Art

There are other receptacles designed for footwear. Typical of these is U.S. Pat. No. 1,597,823 issued to Randolph on Aug. 31, 1926.

Another patent was issued to Agrillo on Aug. 28, 1956 as U.S. Pat. No. 2,760,278. Yet another U.S. Pat. No. 2,897,609 was issued to Bodkin on Aug. 4, 1959 and still yet another was issued on Oct. 27, 1987 to Dassler as U.S. Pat. No. 4,703,445.

Another patent was issued to Ormanns et al. on Sep. 26, 1989 as U.S. Pat. No. 4,870,700. Yet another U.S. Pat. No. 5,473,518 was issued to Haber et al. on Dec. 5, 1995. Another was issued to Goldston et al. on Feb. 15, 1994 as U.S. Pat. No. 5,285,586 and still yet another was issued on Sep. 17, 1996 to Musa as U.S. Pat. No. 5,557,259.

Another patent was issued to McCarthy on Nov. 12, 1996 as U.S. Pat. No. 5,574,432. Yet another U.S. Pat. No. 5,655,316 was issued to Huang on Aug. 12, 1997. Another was issued to Ingargiola et al. on May 5, 1998 as U.S. Pat. No. 5,748,087 and still yet another was issued on Oct. 26, 1999 to Inman as U.S. Pat. No. 5,970,631.

Another patent was issued to Robinson on Jan. 11, 2000 as U.S. Pat. No. 6,012,822. Yet another U.S. Pat. No. 6,014,080 was issued to Layson, Jr. on Jan. 11, 2000. Another was issued to James on Jun. 19, 2001 as U.S. Pat. No. 6,247,251.

U.S. Pat. No. 1,597,823

Inventor: Simon Randolph

Issued: Aug. 31, 1926

In combination with a shoe including a heel section formed with an opening extending longitudinally of the shoe and opening at the front and rear walls of the heel, a lining disposed in said opening and including a rear wall for closing the opening at the rear of the heel, a self-contained electrically operated illuminating means disposed inwardly of the lining in a manner whereby the light rays therefrom will project from the opening at the front of the heel, normally spaced apart contact arms disposed inwardly of the rear wall of the lining, and means carried by the rear wall of the lining, and means carried by the real wall of the lining for moving the contact arms into engagement with one another for completing the circuit through the illuminating means.

U.S. Pat. No. 2,760,278

Inventor: Paul Agrillo

Issued: Aug. 28, 1956

A shoe, the combination which comprises a sole, an upper mounted on the sole, a heel supporting the rear portion of the sole in an elevated position, a wearing sole covering and secured to the lower surface of the heel and extended forwardly to a point spaced from the toe, said wearing sole being secured to the lower surface of the forward portion of the shoe and the heel portion being flush with side surfaces of the heel of the shoe, a wedge-shaped pad positioned in and substantially filling the area between the forward surface of the heel and point of intersection of the lower surface of the sole of the shoe and upper surface of the wearing sole, said wedge-shaped pad having a substantially semi-spherical opening in the intermediate part, a substantially hemispherical balancing element with a vertically disposed opening therethrough positioned in the hemispherical opening of the pad, and a coil spring positioned in the opening of the balancing element and extended from the sole of the shoe to the inner surface of the wearing sole.

U.S. Pat. No. 2,897,609

Inventor: Lawrence E. Bodkin

Issued: Aug. 4, 1959

A shoe having a sole member including an integral heel portion, an arcuate guard element affixed to the heel portion of said sole member and depending therefrom and forming therewith a walled socket having an opening, a movable heel member fitting said socket, said movable heel member having a forward end and a rearward end, a hinge attaching said forward end to said sole member, said opening being positioned and proportioned to pass said movable member into and out of said socket as said movable member is swung on said hinge, releasable friction catch means carried by and disposed within said socket and cooperative catch means when said movable member is in housed position in said socket, said catch means being disposed spaced from the axis of said hinge, said movable member having a surface portion engaging a portion of the wall of said socket and having a storage chamber opening through said surface portion and normally closed by said socket wall portion when said movable ember is housed in said socket and accessible when said movable member is swung from said socket.

U.S. Pat. No. 4,703,445

Inventor: Armin A. Dassler

Issued: Oct. 27, 1987

An athletic shoe system for running disciplines and a process for emitting and or exchanging information concerning movement factors of running disciplines enabling the athlete to always be sufficiently informed regarding his her training program that is in progress or completed. In particular, in an area of the sole that is less stressed during use, at least one free space is provided where a transmitter is housed which, via a sensor provided in the sole, can emit at least one output signal. In accordance with preferred embodiments, a transmitter in a first shoe of a pair of shoes receives the signals from the sensor and transmits emissions in correspondence with their receipt. The transmitted emissions are received by a remote receiver, that is linked with a computer, and the remote receiver receives the transmitted emissions directly from the transmitter of the first shoe and indirectly via a receiver and transmitter of a second shoe of the pair. The computer determines the distance between the first and second shoes, on the basis of the delay between receipt by the remote receiver of the directly and indirectly received emissions, as well as other characteristic values related to stride rate or length.

U.S. Pat. No. 4,870,700

Inventor: Siegfried Ormanns

Issued: Sep. 26, 1989

The personal safety radio device is carried by the person to be protected on a mounting device, for instance incorporated in the heel of a work shoe, and includes a transmitter powered by a current source specific to the device, a receiver and an antenna arrangement. In order to ensure a high operational reliability and a long maintenance-free service life at a high range of transmission the device- specific current source is a rechargeable accumulator which may be charged by a generator arrangement including a piezo-electric converter during the operational usage of the device. The piezoelectric converter is so arranged in the work shoe that it is acted on by the weight of the person wearing the work shoe and thus converts the pressure of the weight into electrical energy.

U.S. Pat. No. 5,473,518

Inventor: Terry M. Haber

Issued: Dec. 5, 1995

A flashing light housing that is adapted to be removably attached to the rear (i.e. heel) of any shoe, such as, for example, a sneaker, sport shoe, training shoe, or the like, without requiring factory alterations to the shoe. A manually accessible light control switch is operable by the wearer to selectively control the energization of a flashing light source that is carried at the interior of the housing. An attachment hook extends from the housing to fit over the top of and around the heel of the shoe, whereby the housing will be suspended from the heel. A resilient attachment band is connected to and extends outwardly and in opposite directions from the flashing light housing. The attachment band is adapted to be fastened to the sole of the shoe at each of a first side and an opposite side thereof, whereby to hold the housing against the heel. By virtue of the foregoing, the flashing light housing is characterized by a large viewing area that is easily visible to on-lookers.

U.S. Pat. No. 5,285,586

Inventor: Mark R. Goldston et al.

Issued: Feb. 15, 1994

An athletic shoe (20) includes a sole (22), an upper (25), and a tongue (26), as well as fasteners (28), such as shoelaces. Incorporated into the sole (22) of the athletic shoe (20) is a receptacle (30) for receiving and retaining a plug-in module (32) in a slide-in, releasably locking arrangement. The plug-in module (32) preferably includes a battery (62), a light emitting device (54), and electrical circuit elements (58, 60, 72) arranged to selectively connect the battery (62) to the light emitting device (54).

U.S. Pat. No. 5,557,259

Inventor: John S. Musa

Issued: Sep. 17, 1996

A proximity alert and direction indicator is provided that allows an observer to monitor the proximity of a subject under surveillance, particularly a child. The subject wears a transmitter removably attached to the shoe. The observer wears a receiver-containing bracelet. The receiver contains a proximity detector with threshold set that emits an audible sound when the distance between the subject and the observer exceeds some preset distance. The receiver also contains a direction finder with graphic display that shows the observer the direction to the subject.

U.S. Pat. No. 5,574,432

Inventor: Steven R. McCarthy

Issued: Nov. 12, 1996

An apparatus attachable to a shoe for deploying a rescue signal includes a base attachable to a rear section of a conventional shoe. The base comprises straps coupled to a lower extent thereof and extended horizontally therefrom. The strips each have a plurality of buttons coupled thereto. The base also comprises a slot formed on an top surface thereof. Also included is a restraining unit adapted to secure about an upper extent of the shoe. The restraining unit comprises an annular band adapted to slidably insert within the slot of the base. The restraining unit further includes a pair of generally triangular members attached to the band and extended downwardly therefrom. The triangular members each have a plurality of buttonholes coupleable to the buttons disposed on the strips of the base. A metal rod is adapted to insert within a lateral bore formed in a heel of the shoe and further within a pair of apertures formed in the strips. Finally, a signaling mechanism situated within the base deploys a rescue signal upon the manual activation thereof or upon the failure to respond to an alarm adapted to indicate the cessation of a predetermined amount of time.

U.S. Pat. No. 5,655,316

Inventor: Tien-Tsai Huang

Issued: Aug. 12, 1997

A shoe including a shoe body having an outsold and an upper fastened to the outsole; an insole formed as an air bag filled with air and mounted within the outsole; a pressure inductor connected to the insole to detect the pressure applied to the insole; a circuit board mounted in the insole and consisting of a pressure converter and a microprocessor, the pressure converter converting the pressure detected by the pressure inductor into a frequency signal to be processed by the microprocessor so that the microprocessor obtains a value corresponding to the pressure applied to the insole; and a liquid crystal display connected to the microprocessor to display the value obtained by the microprocessor.

U.S. Pat. No. 5,748,087

Inventor: Ingargiola et al.

Issued: May 5, 1998

Articles of footwear incorporating one or more sliding elements are described. Such articles include shoes, sandals, boots, and appliances for attachment to any or all of the foregoing. In addition to serving the traditional functions of footwear lacking such sliding elements, such footwear can be used for recreational "grinding," or sliding across hard surfaces having edges, corners, etc.

U.S. Pat. No. 5,970,631

Inventor: David G. Inman

Issued: Oct. 26, 1999

Articles of footwear incorporating one or more sliding elements are described. Such articles include shoes, sandals, boots, and appliances for attachment to any or all of the foregoing. In addition to serving the traditional functions of footwear lacking such sliding elements, such footwear can be used for recreational "grinding," or sliding across hard surfaces having edges, corners, etc.

U.S. Pat. No. 6,012,822

Inventor: William J. Robinson

Issued: Jan. 11, 2000

A light flasher for an article of apparel includes one or more lamps that produce light visible from the exterior of the apparel. A switch, which may be of the mechanical or electronic variety, causes a switch closure responsive to motion of the apparel. A circuit, attached to the switch and the light, causes the lights to illuminate in a series of random duration flashes for a predefined time interval in response to the closure of the switch.

U.S. Pat. No. 6,014,080

Inventor: Hoyt M. Layson, Jr.

Issued: Jan. 11, 2000

Tamper resistant body-worn tracking device to be worn by offenders or potential victims for use in a wireless communication system receiving signals from a global positioning system (GPS). The tracking device directly communicates spatial coordinates to multiple remote sites. The tracking device is an enclosed case worn on a limb of a person. The case contains a battery, a signaling device, and a circuit board containing a field programmable gate array, a wireless data modem, a conventional GPS receiver, and a matched filtering GPS receiver.

U.S. Pat. No. 6,247,251

Inventor: Brent James

Issued: Jun. 19, 2001

A grind shoe apparatus incorporating a variable friction grind plate complementally received in the recess of the shoe sole and having a downwardly facing trough and an outwardly facing rail with respective slide surfaces for contacting a support surface to slide therealong. Such plate further includes at least one speed control compartment positioned within one of such slide surfaces and having an insert removably carried therein for varying the frictional resistance occurring during sliding maneuvers.

While these devices may be suitable for the purposes for which they were designed, they would not be as suitable for the purposes of the present invention, as hereinafter described.

SUMMARY OF THE PRESENT INVENTION

The present invention relates generally to location detection systems and, more specifically, to personal safety systems including a device that can be activated upon attachment or on demand and able to determine and transmit data related to the location of the device for monitoring at a central monitoring station which disseminates the data through the use of proprietary software, wireless communications, wire based land communications and the Internet.

The personal safety system includes a central monitoring station and at least one locator device. The locator device includes a GPS position device for generating location data regarding said device and transponder for wirelessly transmitting the location data to the central monitoring station.

The transponder has a receiver for receiving a location request signal from the central monitoring station, whereby the transponder generates a response signal including location information upon receipt of the location request signal. The central monitoring station disseminates the data through the use of proprietary software, wireless communications, wire based land communications and the Internet.

The locator device of the present invention can be incorporated into footwear forming an integral part therewith and in the preferred embodiment is a module that can be inserted into a preformed socket contained within footwear. Said socket preferably made either in the midsole or heel of the footwear.

The present invention additionally provides for the locator unit to be placed within the tongue of the footwear.

A primary object of the present invention is to provide a system for locating an individual that will overcome the shortcomings of prior art devices.

A further object of the present invention is to provide a system for locating an individual which is able to be remotely activated to initiate a location mode for determining the location of the locator unit.

A yet further object of the present invention is to provide a system for locating an individual wherein a central station is able to determine the location of a locator unit upon receipt of a location request.

A still further object of the present invention is to provide a system for locating an individual wherein the locator units are assigned a unique identification number.

Another object of the present invention is to provide a system including a unique identification code which is used to request information on the location of the locator unit and thus determine the location of the person or object to which the device is attached.

Yet another object of the present invention is to provide a system for locating an individual wherein the central station may continuously monitor via wireless communication devices said locator unit.

Still yet another object of the present invention is to provide a locator unit which is able to be easily attached to an object and relay location information to a central monitoring unit.

A further object of the present invention is to provide a personal safety device having means for wirelessly transmitting location data to the central monitoring station.

A yet further object of the present invention is to provide a personal safety device which is activated upon attachment to the person and able to provide information regarding location of the locator unit.

A still yet further object of the present invention is to provide footwear having the locator unit contained therein and forming an integral part therewith.

Another object of the present invention is to provide a modular locator unit including GPS location determination device, transponder and antenna.

Yet another object of the present invention is to provide a modular locator unit that can be inserted and removed from a socket formed within footwear.

Still yet another object of the present invention is to provide footwear having GPS location determination unit contained therein.

A further object of the present invention is to provide footwear having a transponder contained therein.

A yet further object of the present invention is to provide footwear having an antenna contained therein.

A still yet further object of the present invention is to provide footwear having a socket for the insertion therein of a locator module.

Another object of the present invention is to provide footwear having a locator module preferable positioned within the instep or heel of the shoe.

Yet another object of the present invention is to provide footwear having a socket with spaced apart walls with locator module engaging members for retaining the positioning of said module.

Still yet another object of the present invention is to provide footwear having a rear wall and frontal aperture for receiving a locator module having closure engaging means.

A further object of the present invention is to provide footwear having a socket for receiving a component that forms an integral part of said footwear.

A yet further another object of the present invention is to provide footwear having a component including a locator unit incorporated therein for determining the location of the wearer.

A still yet further object of the present invention is to provide footwear having a component that can have a transponder for remotely querying the transponder for the GPS data.

Another object of the present invention is to provide a unit having a positioning determining device and transponder for querying for the positioning data from a module that can be exteriorly attached to a shoe.

Yet another object of the present invention is to provide a system for locating an individual that is simple and easy to use.

Still yet another object of the present invention is to provide a system for locating an individual that is economical in cost to manufacture.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The present invention overcomes the shortcomings of the prior art by providing a modular locator unit that can be inserted into a preformed socket whereby a central monitoring station can determine the location of the wearer of said footwear. Additionally providing for footwear having a locator unit either forming an integral part therewith or exteriorly fastened thereto.

The locator unit has means for engaging the side walls of the socket and closure means for securing the unit within said socket.

Furthermore, a locator module having a housing, fastener means, positioning determining means and transponder means for transmitting the positioning data can be removably attached to the exterior of the footwear.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

List of Reference Numerals Utilized in the Drawings

10 footwear with location determination means
12 transponder
14 footwear
16 mid-sole
18 heel
20 tongue
22 antenna
24 GPS
26 determination data
28 satellite
30 wireless
32 cell tower
34 radio waves
36 air waves
38 location request transmission
40 location response transmission

42 central station
44 Internet
46 electronic equipment
48 PDA
50 laptop
52 computer
54 phone
56 footwear sole
58 mid-sole cavity
60 cavity wall
62 cavity top surface
64 guide track
66 clips
68 GPS circuit
70 Transponder communications

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
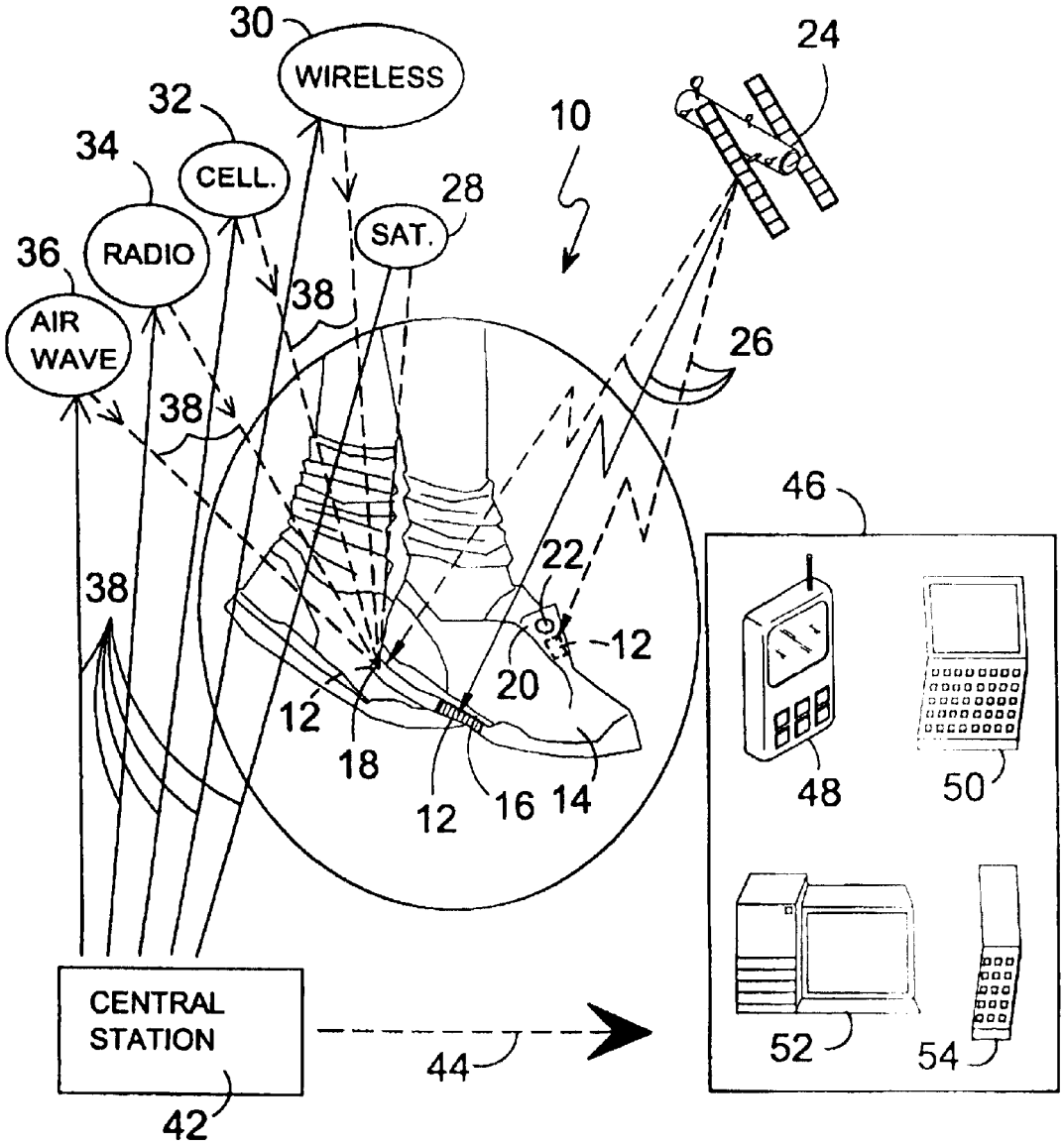
FIG. 1 is an illustrative view of the present invention in use.

Referring to FIG. 1, shown is an illustrative view of the present invention in use. Shown is the footwear 14 of the present invention having a locator unit 12 contained therein. The transponder 12 in the preferred embodiment is located within the midsole 16 of the footwear 14 but provides for an alternate location in the heel 18 or tongue 20. The transponder 12 provides position determination by computational calculating the location using signals 26 transmitted by GPS system 24. The transponder 12 having means for receiving a location request transmission 38 from a central monitoring station 42 using communications medium 28, 30, 32, 34,36 causes said transponder 12 to initiate a location determination sequence by receiving signals 26 from the available plurality of GPS satellites 24 and computationally calculating position determination data that will be subsequently transmitted to the central monitoring station 42 that can forward said data to subscriber communication equipment 46 comprising PDA 48, laptop 50, computer 52, or phone 54 using the Internet 44.

Figure 2:
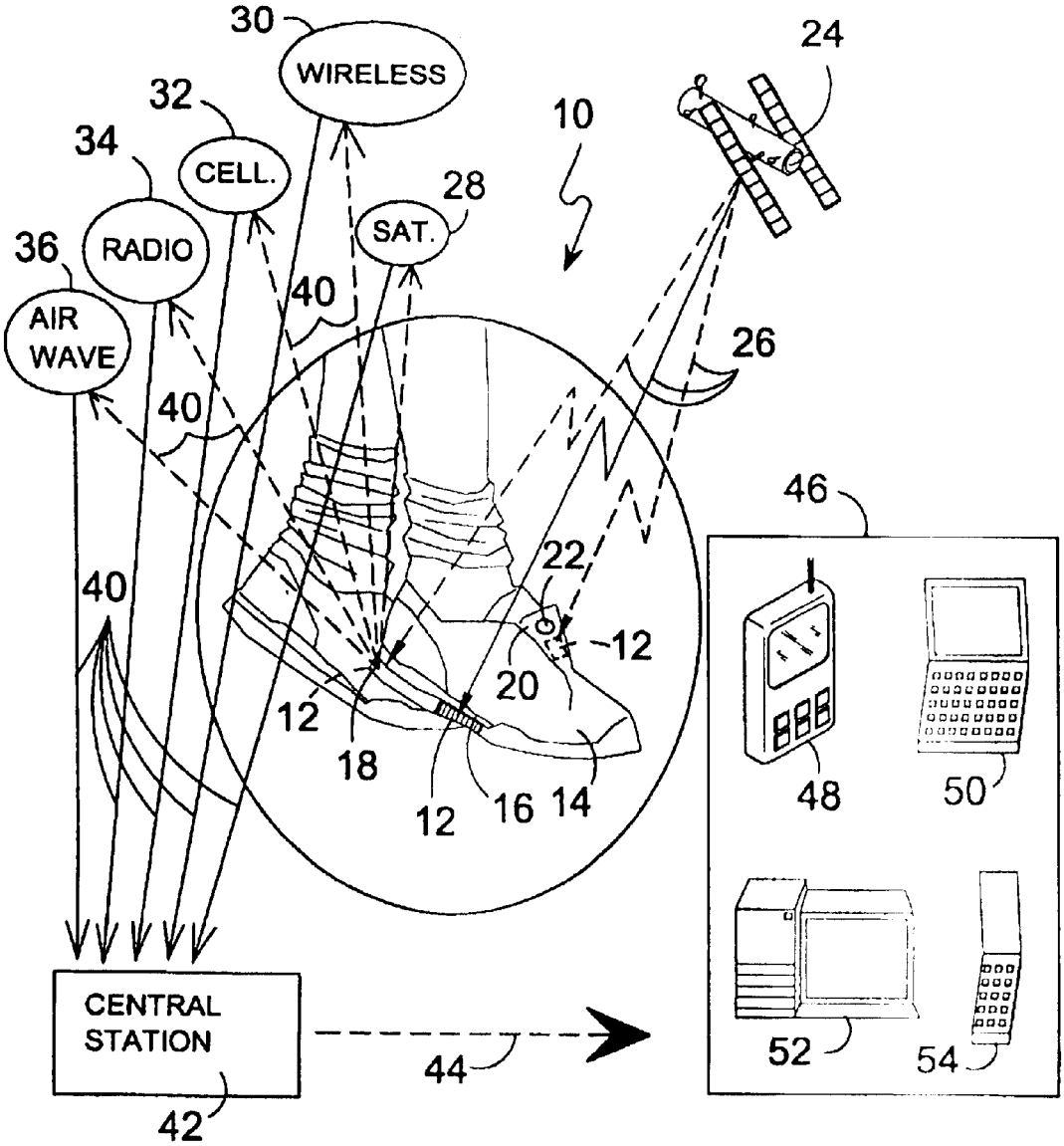
FIG. 2 is another illustrative view of the present invention in use.

Referring to FIG. 2, shown is another illustrative view of the present invention in use. Shown is the footwear 14 of the present invention having a locator unit 12 contained therein. The transponder 12 having received a location request transmission 38 from a central monitoring station 42 using communications medium 28, 30, 32, 34,36 and computationally calculating position determination data using signals 26 from the available plurality of GPS satellites 24 transmits the data 40 to the central monitoring station 42 whereupon the central monitoring station 42 can forward said data to subscriber communication equipment 46 which can include PDA 48, laptop 50, computer 52, or phone 54 using the Internet 44.

Figure 3:
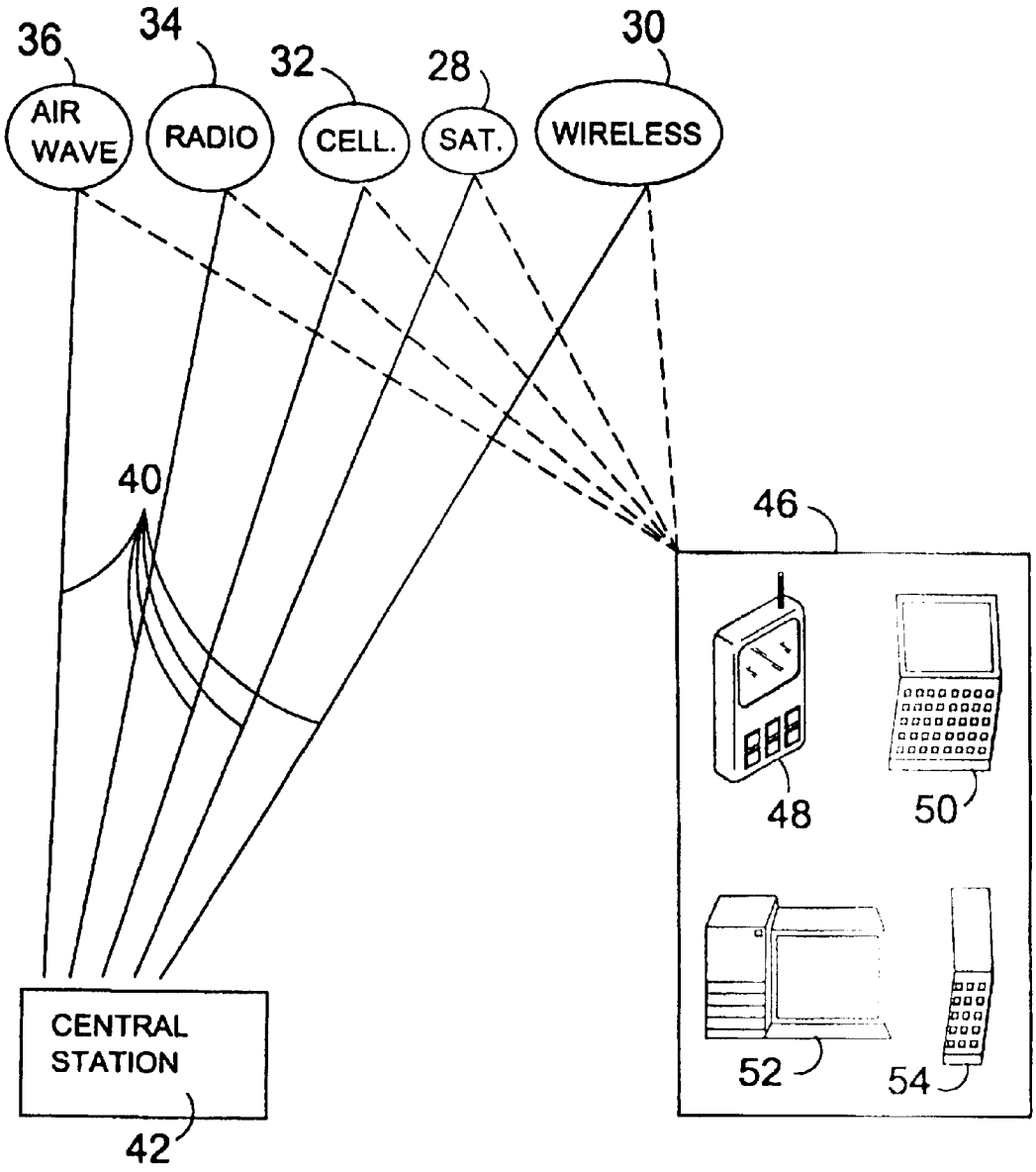
FIG. 3 is another illustrative view of the present invention in use.

Referring to FIG. 3, shown is another illustrative view of the present invention in use. The footwear transponder 12 having received a location request transmission 38 from a central monitoring station 42 using communications medium 28, 30, 32, 34,36 and computationally calculating position determination data using signals 26 from the available plurality of GPS satellites 24 transmits the data 40 to the central monitoring station 42 whereupon the central monitoring station 42 can forward said data to subscriber communication equipment 46 which can include PDA 48, laptop 50, computer 52, or phone 54 using communications medium satellite technology 28, wireless technology 30, cellular technology 32, technology using radio waves 34 and technology using air waves 36.

Figure 4:
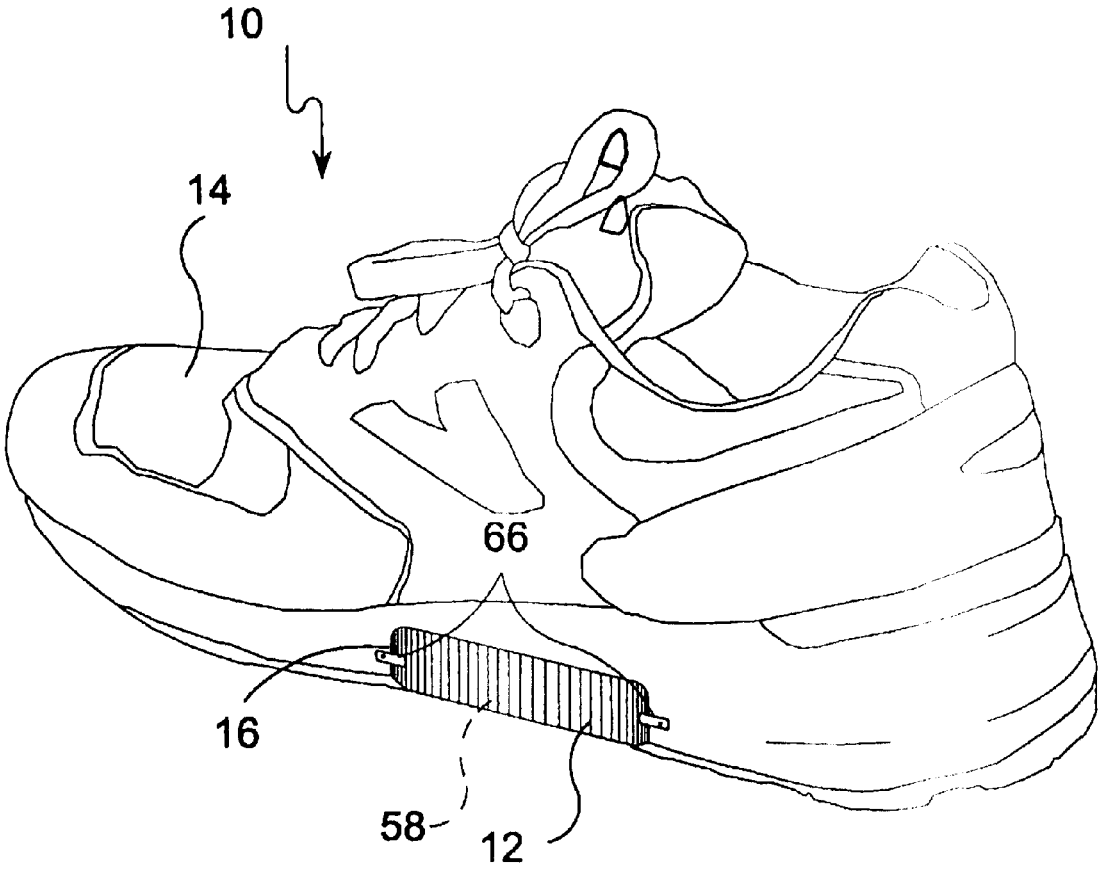
FIG. 4 is a perspective view of the present invention incorporated into the midsole of a shoe.

Referring to FIG. 4 is a perspective view of the footwear 14 of the present invention having a transponder 12 incorporated into the midsole 16. The footwear 14 has a socket 58 located in the midsole of the footwear for inserting a modular locator unit 12. Said modular locator unit 12 having a GPS position determination device for generating location data regarding said locator unit and transponder for wirelessly transmitting the location data 40 to the central monitoring station 42. The transponder has a receiver for receiving a location request signal 38 from the central monitoring station 42, whereby the transponder generates a response signal 40 including location information upon receipt of the location request signal 38.

Figure 5:
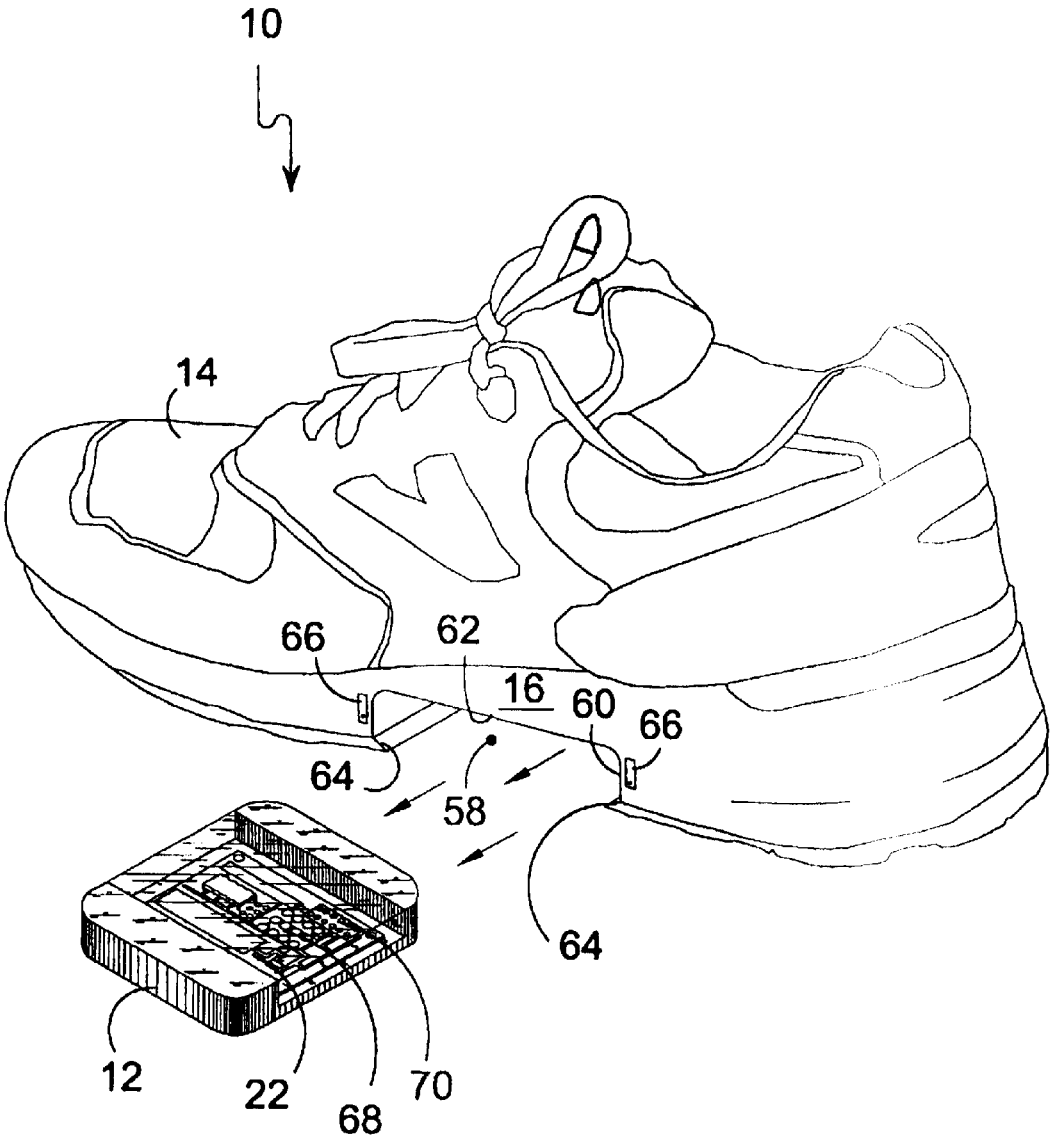
FIG. 5 is a perspective view of the locator unit removed from the midsole socket of the shoe.

Referring to FIG. 5, shown is a perspective view of the location determination module 12 removed from the midsole 16 socket 58 of the shoe 14. The modular locator unit 12 includes a GPS unit 68 and transponder 70 placed within a mid sole cavity 58 providing means for locating the wearer. The modular unit 12 design consists of a portable self contained GPS 68, antenna 22 and communications module 70, that can be housed within a nylon or plastic housing that is molded to fit into the mid sole cavity 58. The mid-sole cavity 58 having spaced apart walls 60 and top wall 62 has module 12 retaining means 64. The detachable modular locator unit 14 is equipped with locking clips 66 to prevent it from accidental removal from the footwear 14. The system can additional be manufactured in a standalone module that can be attached to the shoe by means of hook and loop material or shoelaces.

Figure 6:
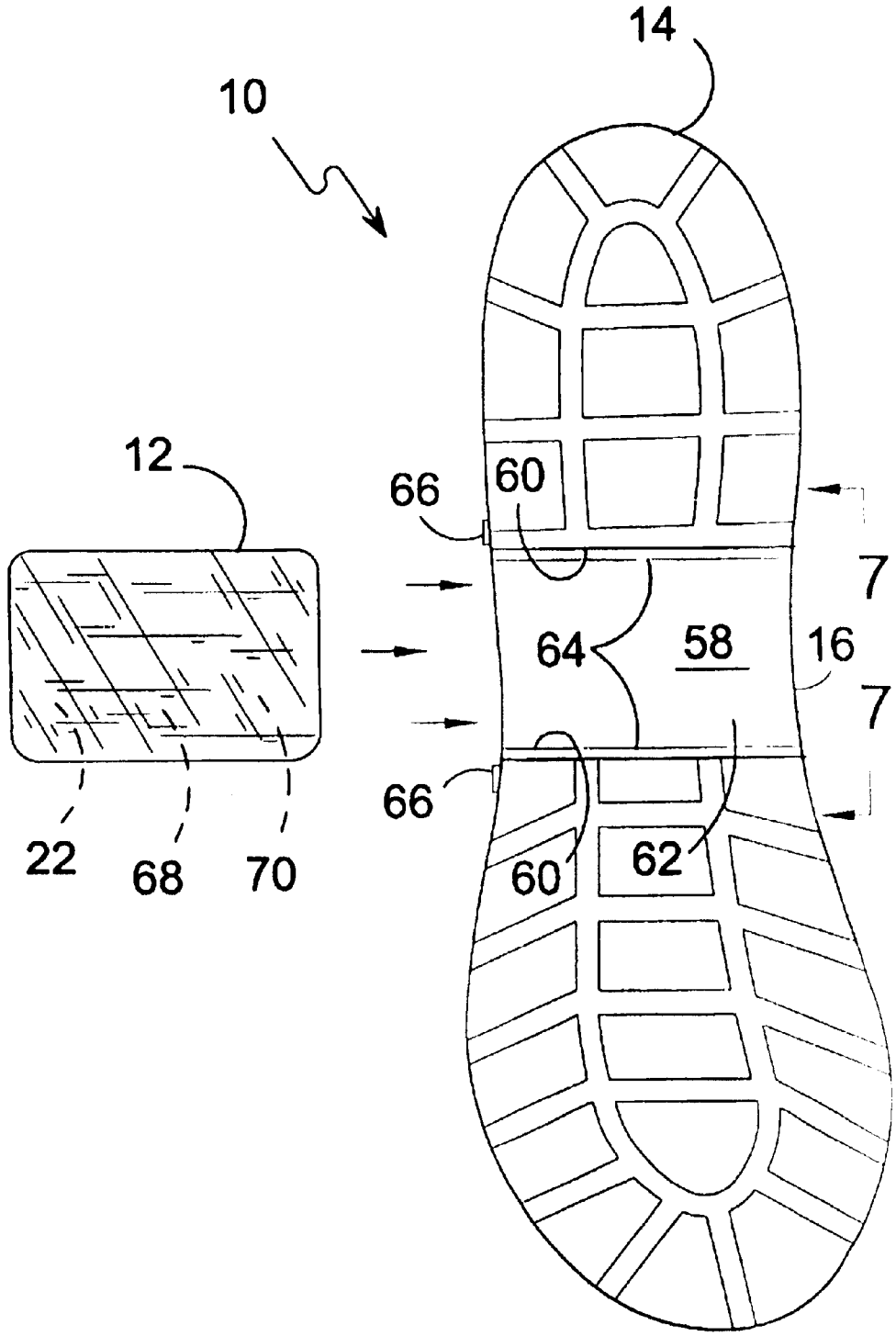
FIG. 6 is a bottom view of the locator unit and midsole fastening means for attaching said locator unit.

Referring to FIG. 6, shown is a bottom view of the footwear 14 of the present invention having the location determination module 12 removed from the midsole 16 socket 58 of the shoe 14. The modular locator unit 12 includes a GPS unit 68 and transponder 70 placed within a mid sole cavity 58 providing means for locating the wearer. The modular unit 12 design consists of a portable self contained GPS 68, antenna 22 and communications module 70 that can be housed within a nylon or plastic housing molded to fit into the mid sole cavity 58. The mid-sole cavity 58 having spaced apart walls 60 and top wall 62 has module 12 retaining means 64. The detachable modular locator unit 14 is equipped with locking clips 66 to prevent it from accidental removal from the footwear 14.

Figure 7:
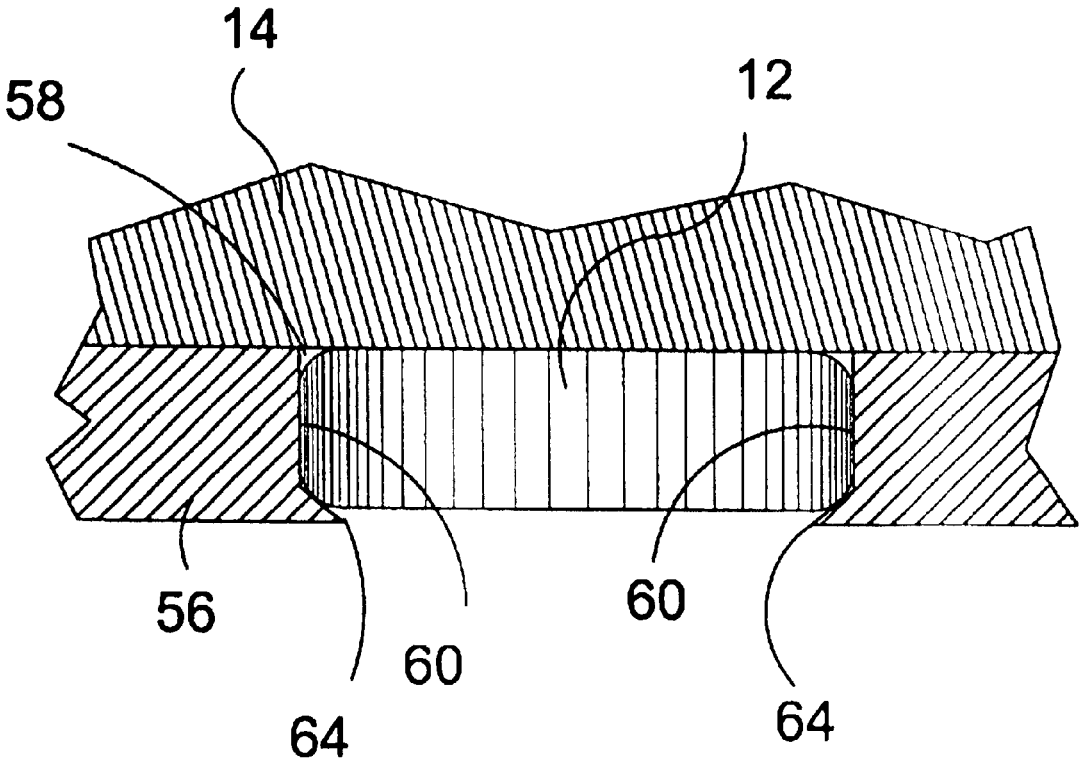
FIG. 7 is a side view of the footwear midsole socket.

Referring to FIG. 7, shown is a side view of the footwear 14 midsole 16 socket 58. Shown is the footwear midsole socket 58 having spaced apart sidewalls 60 with means 64 for engaging the modular locator unit 12. The insertable removable locator unit 12 has means for engaging the side walls 60 of the socket and closure means 66 for securing the locator unit 14 within said socket 58.

Figure 8:
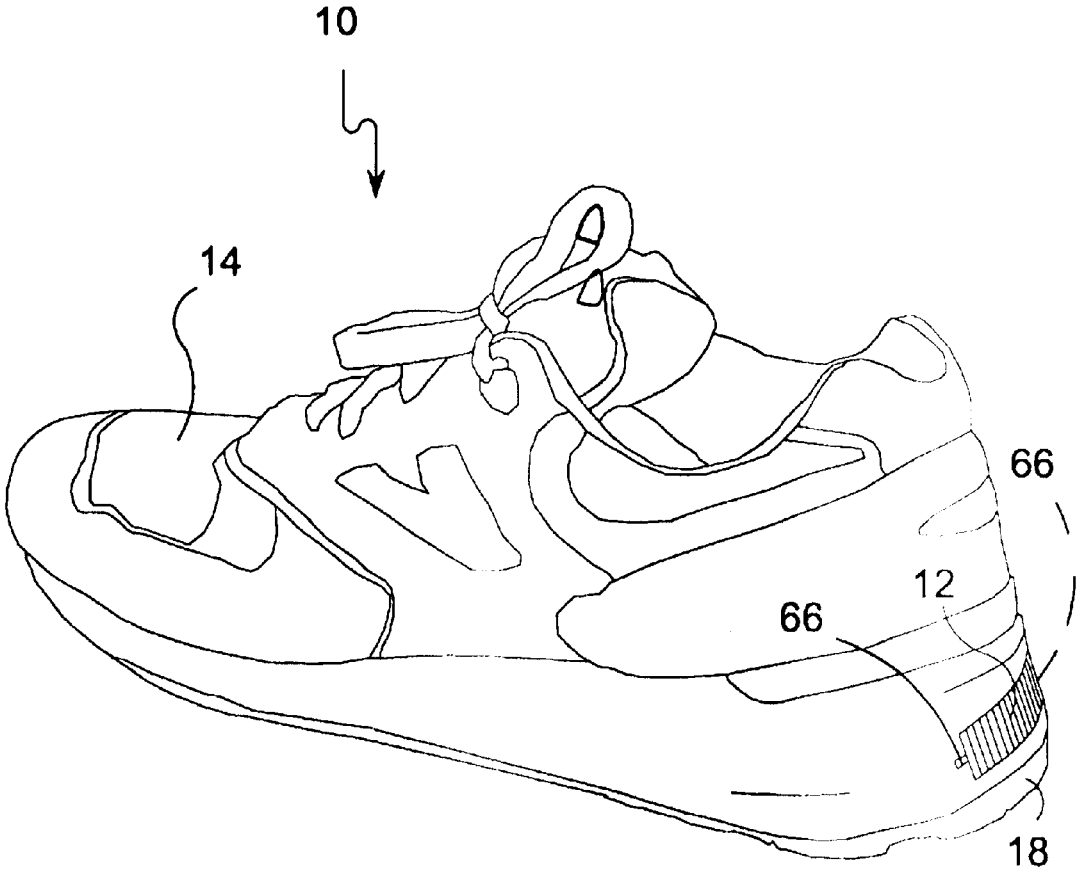
FIG. 8 is a perspective view of the present invention incorporated into the heel of a shoe.

Referring to FIG. 8, shown is a perspective view of the present invention incorporated into the heel 18 of a shoe 14. Shown is an additional element of the present invention wherein the footwear 14 has a socket located in the heel 18 of the footwear for inserting a modular locator unit 12. Said modular locator unit having a GPS position determination device for generating location data regarding said locator unit and transponder for wirelessly transmitting the location data to the central monitoring station and an antenna. The transponder has a receiver for receiving a location request signal from the central monitoring station, whereby the transponder generates a response signal including location information upon receipt of the location request signal.

Figure 9:
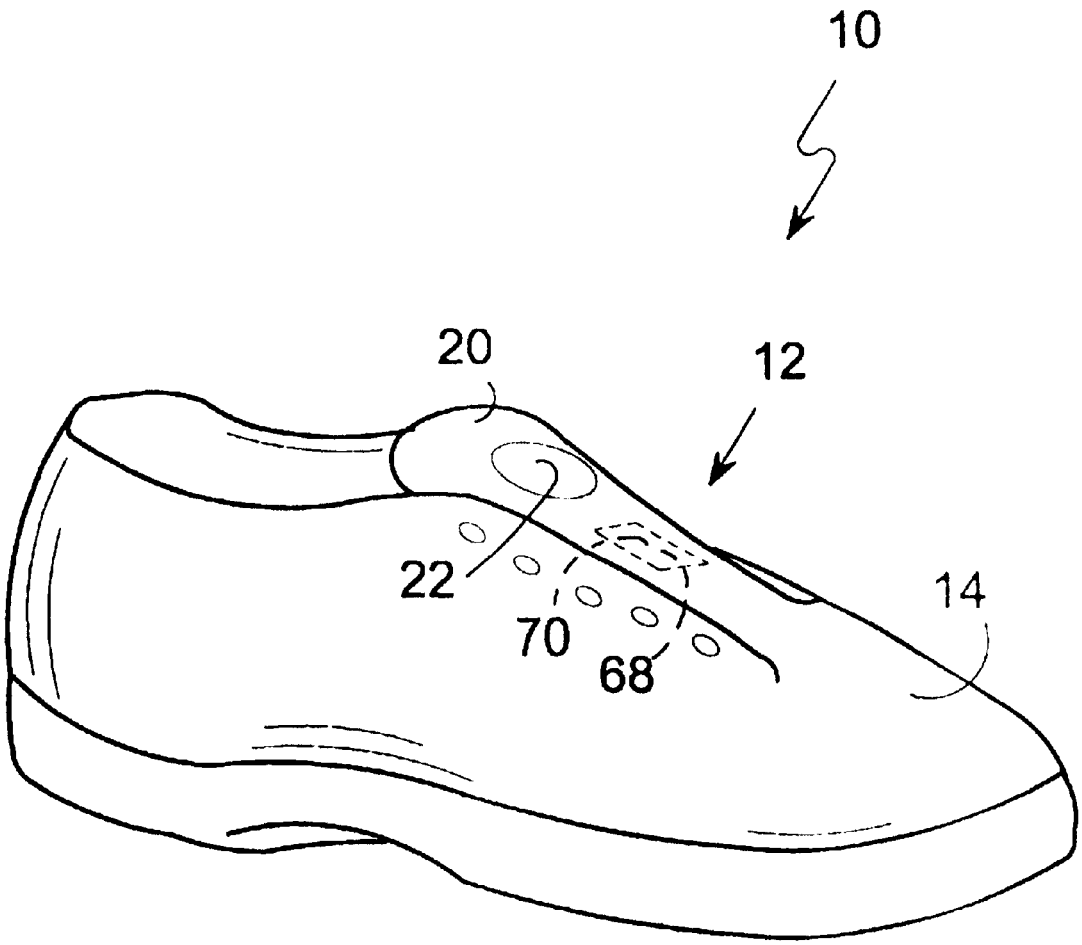
FIG. 9 is a perspective view of the present invention incorporated into the [heal] *tongue* of a shoe.

Referring to FIG. 9, shown is a perspective view of the present invention having the locator device including a GPS position determination device 68 for generating location data regarding said locator unit and transponder 70 for wirelessly transmitting the location data to the central monitoring station 42 and an antenna 22 contained with a logo exteriorly positioned on the tongue 20 of the shoe. The transponder has a receiver for receiving a location request signal 38 from the central monitoring station 42, whereby the transponder 70 generates a response signal 40 including location information upon receipt of the location request signal 38.

What is claimed is new and desired to be protected by Letters Patent is set forth in the appended claims:

[1. Footwear in combination with location determination means comprising;

a) footwear having a sole with a midsole;

b) receiving means for receiving broadcasted location determination signals transmitted by a Global Positioning System and for receiving a transmission from a central station;

c) means for computationally processing location determinations signals;

d) transmission means for bradcasting the results of said computational processing; and e) a socket formed in said midsole for receiving a module containing said receiving means, processing means and transmission means, said module slidable in and out of said midsole so that said module has an outer surface forming part of the sole of said footwear when inserted into said socket, and clips on an outside of said footwear adjacent said socket to prevent said module from coming out of said socket when said footwear is in use.]

[2. The system as recited in claim 1, wherein said transmission means is wireless.]

[3. The system as recited in claim 1, wherein said wireless transmission is intended for receipt by a central station.]

[4. The system as recited in claim 3, wherein said wireless transmission uses cellular technology to transmit said transmission to said central station.]

[5. The system as recited in claim 3, wherein said wireless transmission uses satellite technology to transmit said transmission to said central station.]

[6. The system as recited in claim 3, wherein said wireless transmission uses radio waves to transmit said transmission to said central station.]

[7. The system as recited in claim 1, wherein said module is assigned a unique and addressable identifier.]

[8. The system as recited in claim 7, wherein said system is passive requiring receipt of a transmission from said central station to activate said system.]

[9. The system as recited in claim 8, wherein said central station can generate a response request for said module using said unique identification.]

[10. The system as recited in claim 9, wherein said central station response request energizes said location determination module to computationally formulate location determination data.]

[11. The system as recited in claim 10, wherein said central station response request causes said location determination module to transmit said location determination data.]

[12. The system as recited in claim 11, wherein said transmitted data forms a response reply further comprising a central station identifier.]

[13. The system as recited in claim 12, wherein said central station identifier provides means for said transmission to be routed to said central station.]

[14. The system as recited in claim 13, wherein said system comprises a subscriber service for a user or guardian of an individual wearing said footwear.]

[15. The system as recited in claim 14, wherein the subscriber service provides the subscriber with a unique subscriber identifier.]

[16. The system as recited in claim 15, wherein said subscriber having a unique subscriber identification can initiate a location request sequence.]

[17. The system as recited in claim 16, wherein the central station location determination data can be received by the subscriber using wireless technology.]

[18. The system as recited in claim 16, wherein the central station location determination data can be received by the subscriber through the Internet.]

[19. The system as recited in claim 16, wherein the central station location determination data can be received by the subscriber through land based wire technology.]

[20. Footwear in combination with location detection means comprising;

a) footwear having a tongue;

b) receiving means for receiving broadcasted location determination signals transmitted by a Global Positioning System and for receiving a transmission from a central station;

c) means for computationally processing location determination signals;

d) transmission means for broadcasting the results of said computational processing;

e) said tongue incorporating a module containing said receiving means, processing means, and said transmission means; and f) an antenna for said module mounted visibly on said tongue forming a logo for said footwear.]

*21. Footwear for locating its wearer, said footwear comprising:*

*a sole including a socket;*

*an upper portion fixed to said sole;*

*a locator unit removably disposed in said socket and operative to*

*receive location signals from a positioning system and computationally process said location signals into position determination data indicative of the geographical location of said locator unit; and*

*a transmitter electrically coupled to said locator unit, said transmitter operative to transmit said position determination data; and*

*wherein at least a portion of said locator unit is removably affixed to said footwear.*

*22. The footwear according to claim 21, wherein an outer surface of said locator unit forms a part of the exterior of said sole when said locator unit is positioned in said socket.*

*23. The footwear according to claim 21, wherein said socket is located in a midsole of said sole.*

*24. The footwear according to claim 21, wherein said socket is located in a heel of said sole.*

*25. The footwear according to claim 21, wherein said sole includes at least one clip to prevent said locator unit from coming out of said socket.*

*26. The footwear according to claim 21, wherein said locator unit can be inserted in said socket from the outside of said footwear.*

*27. The footwear according to claim 21, wherein said socket includes a plurality of members that position and support said locator unit in said socket.*

*28. The footwear according to claim 21, wherein said transmitter transmits said position determination data via a wireless network.*

*29. The footwear according to claim 28, wherein said transmitter transmits said position determination data via a cellular network.*

*30. A location module comprising:*

*a positioning unit operative to receive positioning signals;*

*a communications module to facilitate communication with a central station;*

*location circuitry, responsive to said positioning signals, and operative to calculate position determination data indicative of the geographical location of said location module; and*

*a footwear engaging device facilitating selective attachment of said location module to footwear, said footwear engaging device being designed to engage a socket formed in said footwear.*

*31. A location module according to claim 30, further comprising a molded housing that forms a portion of the exterior of a sole of said footwear when said location module is positioned in said socket.*

*32. Footwear for locating its wearer, said footwear comprising:*

*a sole;*

*an upper portion fixed to said sole;*

*a locator unit for receiving location signals from a positioning system and processing said location signals into position determination data indicative of the geographical location of said locator unit; and*

*a transmitter for transmitting said position determination data; and*

*means for removably disposing said locator unit in a socket of said footwear.*

*33. A method of locating footwear, said method comprising:*

*providing footwear with a sole and an upper portion fixed to said sole;*

*providing a locator unit operative to*

*receive location signals from a positioning system and computationally process said location signals into position determination data indicative of the geographical location of said locator unit;*

*providing a transmitter electrically coupled to said locator unit and operative to transmit said position determination data to a predetermined receiver; and*

*removably affixing at least a portion of said locator unit to said footwear by inserting said locator unit into a socket formed in said sole.*

*34. A method according to claim 33, wherein inserting said locator unit into a socket formed in said sole includes inserting said locator unit into said socket from outside of said footwear.*

*35. Footwear for locating its wearer, said footwear comprising:*

*a sole;*

*an upper portion fixed to said sole;*

*a locator unit operative to*

*receive location signals from a positioning system and computationally process said location signals into position determination data indicative of the geographical location of said locator unit;*

*an antenna electrically coupled to said locator unit; and*

*a transmitter electrically coupled to said locator unit, said transmitter operative to transmit said position determination data; and wherein*

*at least a portion of said locator unit is removably affixed to said footwear; and*

*said antenna is releasably attached to said footwear.*

*36. Footwear for locating its wearer, said footwear comprising:*

*a sole;*

*an upper portion fixed to said sole;*

*a locator unit operative to*

*receive location signals from a positioning system and computationally process said location signals into position determination data indicative of the geographical location of said locator unit;*

*an antenna electrically coupled to said locator unit; and*

*a transmitter electrically coupled to said locator unit, said transmitter operative to transmit said position determination data; and wherein*

*at least a portion of said locator unit is removably affixed to said footwear; and*

*said antenna forms at least a portion of a logo affixed to said upper portion of said footwear.*

*37. A method of locating footwear, said method comprising:*

*providing footwear with a sole and an upper portion fixed to said sole;*

*providing a locator unit operative to*

*receive location signals from a positioning system and computationally process said location signals into position determination data indicative of the geographical location of said locator unit;*

*providing a transmitter electrically coupled to said locator unit and operative to transmit said position determination data to a predetermined receiver; and*

*removably affixing said locator unit to the exterior of said footwear.*

*38. A method according to claim 37, wherein:*

*providing said locator unit includes providing said locator unit with an engaging structure;*

*providing said footwear includes providing said footwear with a complementary engaging structure configured to engage the engaging structure of said locator unit; and*

*removably affixing at least a portion of said locator unit to the exterior of said footwear includes engaging said engaging structure of said locator unit with said complementary engaging structure of said footwear.*

*39. Footwear for locating its wearer, said footwear comprising:*

*a sole;*

*an upper portion fixed to said sole;*

*a locator unit including a engaging structure and being operative to*

*receive location signals from a positioning system and*

*computationally process said location signals into position determination data indicative of the geographical location of said locator unit;*

*a transmitter electrically coupled to said locator unit, said transmitter operative to broadcast said position determination data; and*

*a complementary engaging structure configured to engage said engaging structure of said locator unit; and*

*wherein at least a portion of said locator unit is removably affixed to said footwear by engaging said engaging structure of said locator unit with said complementary engaging structure of said footwear.*

* * * * *